United States Patent [19]

Szpitalak

[11] 3,976,187
[45] Aug. 24, 1976

[54] RECIPROCATING PUSHER FOR TRANSFERRING ARTICLES BETWEEN CONVEYORS

[75] Inventor: Wesley J. Szpitalak, Palos Park, Ill.

[73] Assignee: Continental Can Company, Inc, New York, N.Y.

[22] Filed: Sept. 24, 1973

[21] Appl. No.: 399,829

Related U.S. Application Data

[62] Division of Ser. No. 242,110, April 7, 1972, Pat. No. 3,786,747, which is a division of Ser. No. 501,372, Oct. 22, 1965, Pat. No. 3,683,799.

[52] U.S. Cl. .................................... 198/24; 198/25
[51] Int. Cl.² ......................................... B65G 47/00
[58] Field of Search ............ 198/24, 31 AB, 25, 34, 198/20 C, 209

[56] References Cited
UNITED STATES PATENTS

| | | | |
|---|---|---|---|
| 854,173 | 5/1907 | Nash | 198/24 UX |
| 1,828,168 | 10/1931 | Ayars | 198/34 |
| 2,770,347 | 11/1956 | Porterfield | 198/25 |

FOREIGN PATENTS OR APPLICATIONS

| | | | |
|---|---|---|---|
| 971,154 | 9/1964 | United Kingdom | 198/20 C |

Primary Examiner—John J. Love
Assistant Examiner—Douglas D. Watts
Attorney, Agent, or Firm—Diller, Brown, Ramik & Wight

[57] ABSTRACT

This disclosure relates to a can body transfer mechanism particularly adapted for use as part of an automatic coating and printing machine wherein can bodies and like tubular members are automatically positioned on mandrels and thereafter serially presented to coating and printing blankets. The transfer apparatus includes a vertically disposed feed screw which spaces can bodies and transfers them to a feed turret which, in turn, transfers the can bodies to a transfer turret. The transfer turret has generally horizontally disposed pockets axially aligned with mandrels carried by an endless chain and there is associated with the transfer turret a pusher turret having a plurality of pusher members thereon axially aligned with the turret pockets and the mandrels and automatically operable by a fixed cam in response to the rotation of the pusher turret to push can bodies from the transfer turret pockets onto the mandrels.

8 Claims, 6 Drawing Figures

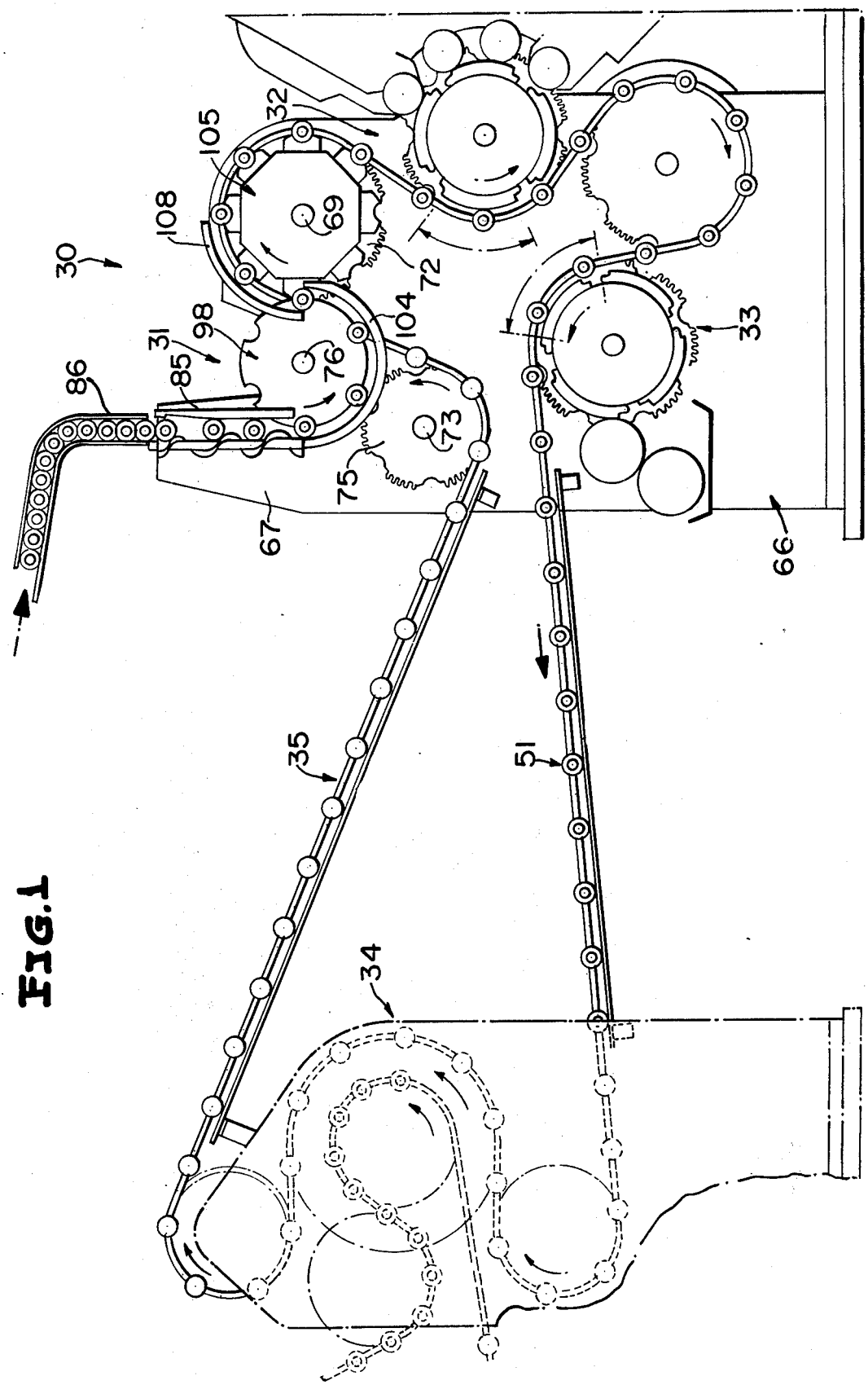

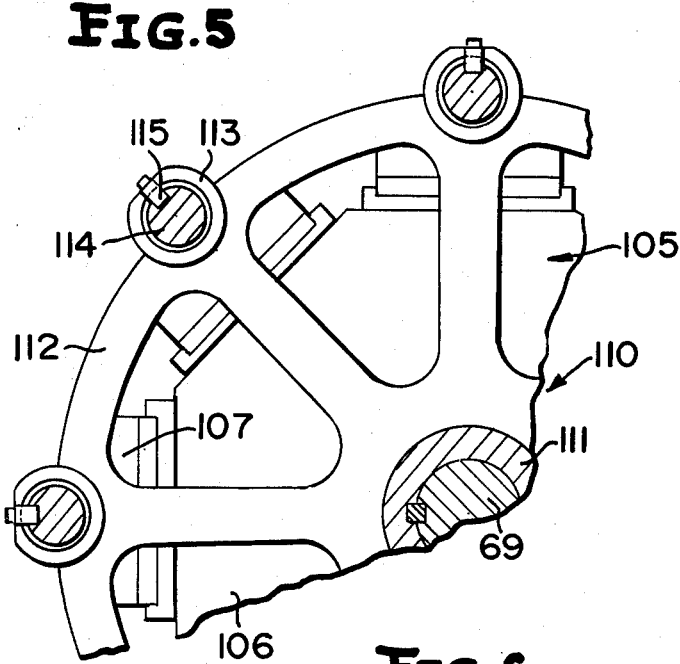
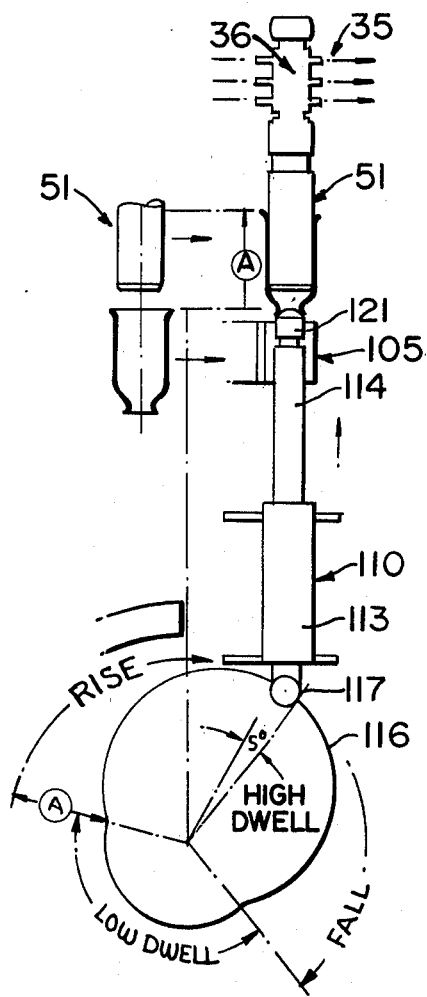
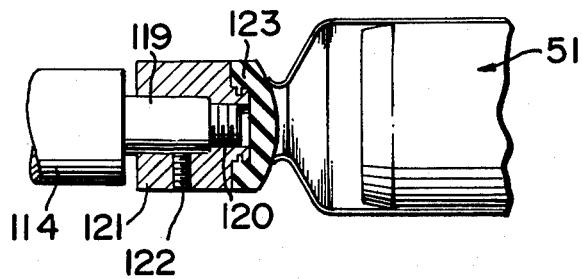

RECIPROCATING PUSHER FOR TRANSFERRING ARTICLES BETWEEN CONVEYORS

This application is a division of my copending application Ser. No. 242,110, filed Apr. 7, 1972 entitled HIGH SPEED CAN PRINTING MACHINE, now U.S. Pat. No. 3,786,747 granted Jan. 22, 1974, which application Ser. No. 242,110 is a division of Ser. No. 501,372, filed Oct. 22, 1965, now U.S. Pat. No. 3,683,799, granted Aug. 15, 1972.

This invention relates in general to new and useful improvements in printing machines, and more specifically to a novel printing machine which is particularly adapted for the high speed printing of can bodies.

Can bodies are principally formed from a flat blank which is shaped into cylindrical form and then secured together by means of a longitudinal seam. When it is desired to have the decoration directly applied to the exterior surface of such can bodies, the flat blanks can be printed in any conventional manner. However, recently there has been an increase in the demand for can bodies which are not formed from flat blanks and therefore cannot be printed or decorated in advance. There has been developed printing presses for printing on these can bodies after the formation thereof. However, these printing presses or machines which have been developed in the past are too slow. A customary type of printing machine is one having a plurality of mandrels carried by a turret with each mandrel being indexed sequentially into position relative to a printing drum and while the mandrel is in its indexed position, the can body carried thereby is presented to the printing drum. The cost of printing can bodies with this type of equipment is prohibitly expensive.

In view of the foregoing, it is the principal object of this invention to provide a novel high speed can printing machine which is capable of continuously printing can bodies and with the capacity of the machine being many times that of prior machines whereby the utilization of the machine is economically feasible.

In accordance with this invention it is proposed to provide a novel high speed can printing machine which includes an endless conveyor having mandrels projecting laterally therefrom, and there being provided means for automatically positioning can bodies on the mandrels.

A further object of this invention is to provide a novel apparatus for automatically applying can bodies to a mandrel, the apparatus including a turret having pockets therein for receiving can bodies and there being provided a feed screw for positioning can bodies to be received by the pockets of the turret, and there being associated with each pocket of the turret pusher which will push from the turret pocket a can body when the mandrel is in alignment with the turret pocket.

With the above and other objects in view that will hereinafter appear, the nature of the invention will be more clearly understood by reference to the following detailed description, the appended claims and the several views illustrated in the accompanying drawings:

IN THE DRAWINGS:

FIG. 1 is a diagrammatic side elevational view of the can printing machine and shows the relationship of the various components thereof.

FIG. 2 is a schematic view showing the function of the pusher for applying a can body to a mandrel.

FIG. 5 is an enlarged fragmentary longitudinal sectional view taken along the line 5—5 of FIG. 3 and shows specifically the details of the carrier mounting the pushers for effecting the placing of can bodies on the mandrels.

FIG. 6 is a fragmentary transverse vertical sectional view taken along the line 6—6 of FIG. 3 and shows the specific details of the head of the pusher and the relationship thereof with respect to a can body.

Figure 3:
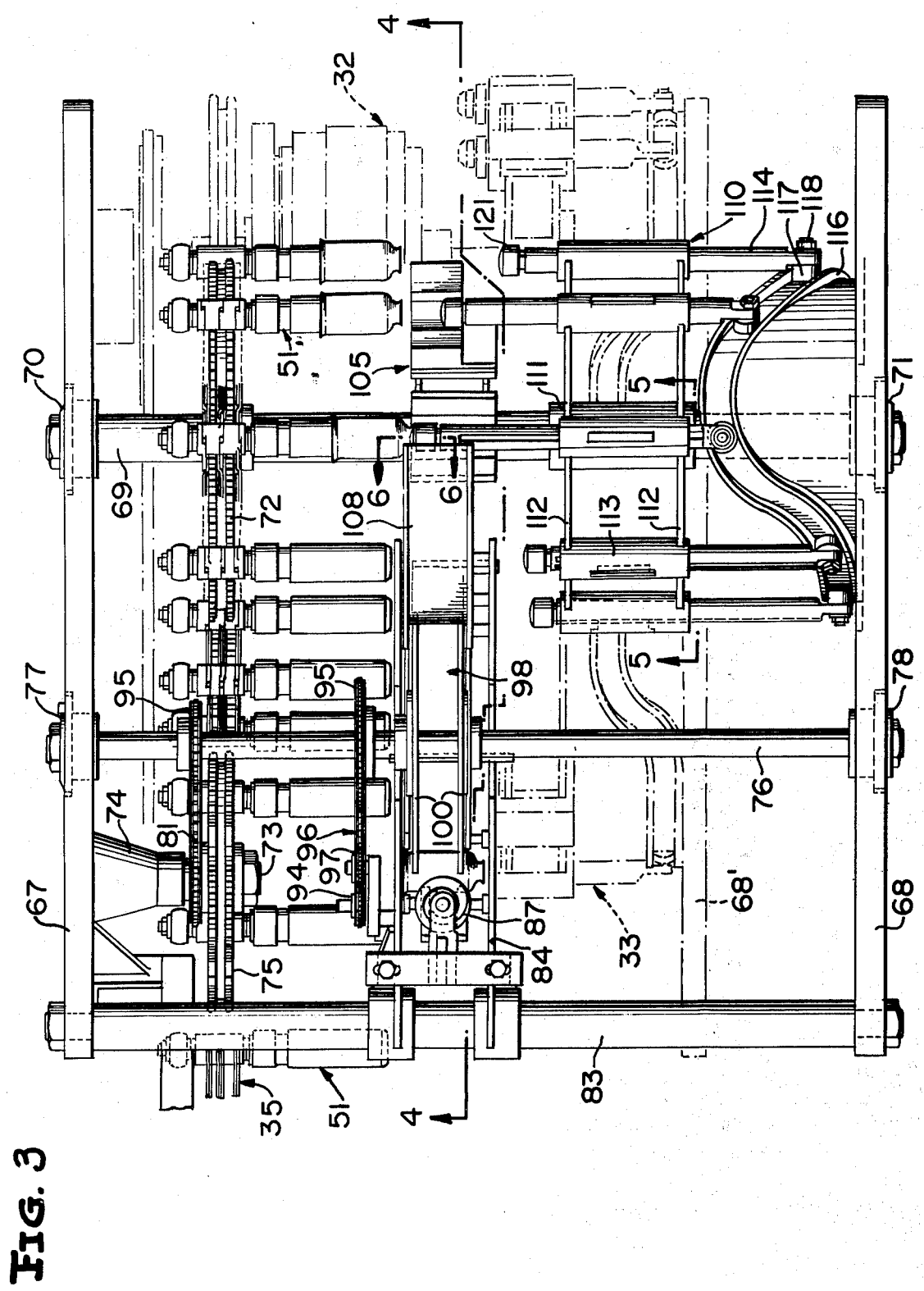
FIG. 3 is a plan view of the printing machine and shows only that portion thereof appearing at the right-hand half of FIG. 1.

Referring now to the drawings in detail, it will be seen that there are illustrated the details of the can printing machine, which is generally referred to by the numeral 30. The can printing machine 30 includes basically a can feed mechanism, which is generally referred to by the numeral 31, a printing mechanism or apparatus, which is generally referred to by the numeral 32, a varnishing apparatus, which is generally referred to by the numeral 33, and a can discharge or transfer apparatus, which is generally referred to by the numeral 34.

All of these mechanisms or apparatus are connected together by an endless conveyor chain which is referred to by the numeral 35. The conveyor chain 35 is for the most part of the conventional type and is of the double row type. However, at regularly spaced intervals, the conveyor chain 35 is provided with special links which are referred to by the numeral 36. It is the constructional detail of the special links 36 which make the chain 35 a special chain.

It will be readily apparent that the link elements 40 and 42 may pivot in unison in one clockwise direction while the link elements 41 and 43 are free to pivot in the Each of the special links 36 carries a mandrel which is generally referred to by the numeral 51.

Figure 4:
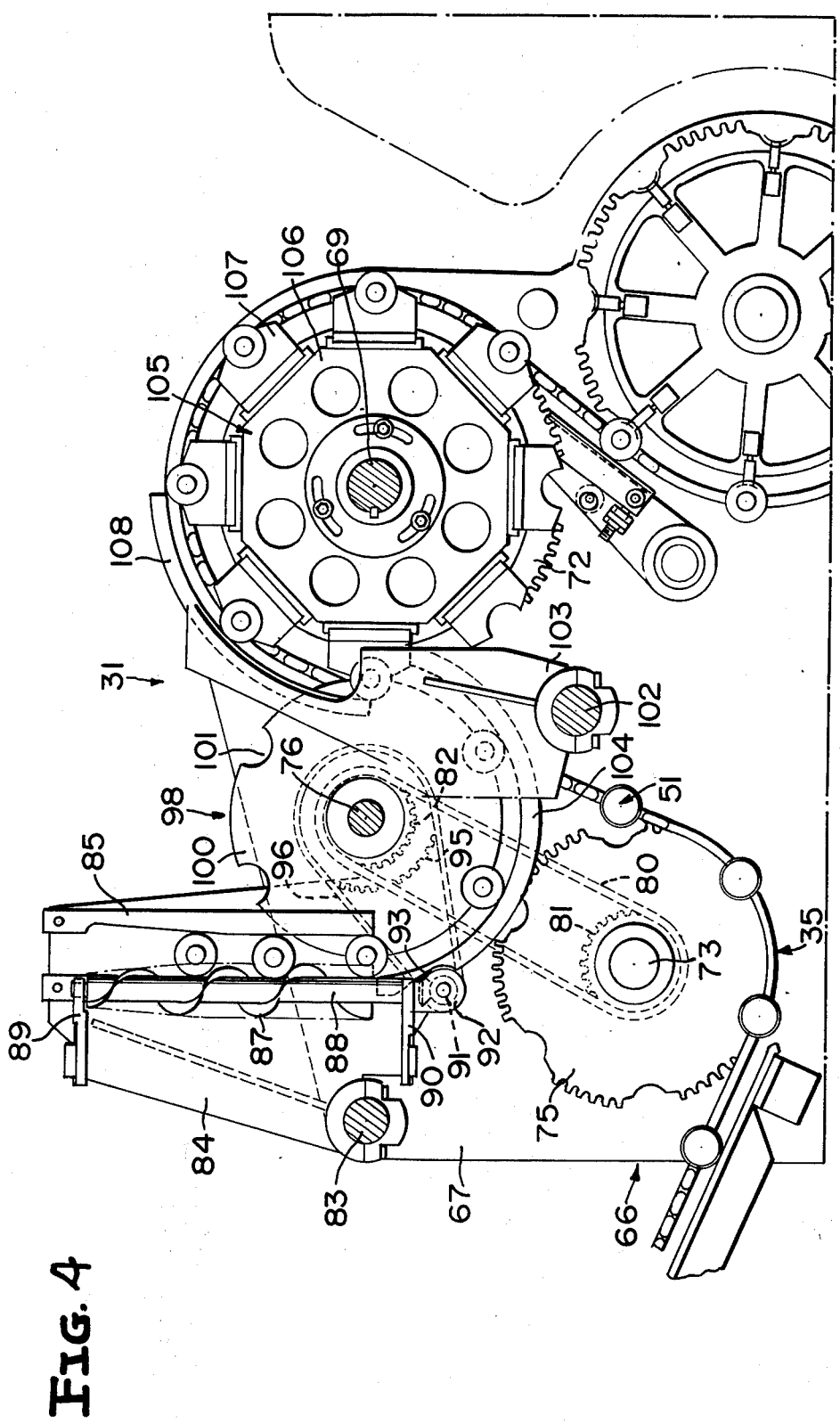
FIG. 4 is a fragmentary longitudinal vertical sectional view taken along the line 4—4 of FIG. 3 and shows specifically the details of the upper part of the can printing machine.

Referring now to FIGS. 1 and 4 in particular, it will be seen that the main portion of the can printing machine 30 is supported by a frame which is generally referred to by the numeral 66. The specific details of the frame, for the most part, form no part of this invention. However, it is to be understood that the frame 66 does include a pair of side plates 67 and 68. The can feed mechanism 31 is mounted in the upper portion of the frame 66. The can feed mechanism 31 includes a shaft 69 which extends transversely of the frame 66 and which is rotatably journalled in suitable bearings 70 and 71 carried by the side plates 67 and 68, respectively. The shaft 69 carries a sprocket 72 over which the chain 35 is entrained. The shaft 69 is thus driven by means of the chain 35.

The can feed mechanism 31 includes a stub shaft 73 which is carried by a housing 74 extending from the side plate 67, as is best shown in FIG. 3. The stub shaft 73 carries a sprocket 75 under which the chain 35 passes before it passes upwardly and around the sprocket 72. The sprocket 75 and the shaft 73 are driven by the chain 35.

A shaft 76 extends across the frame 66 to the left to the shaft 69. The shaft 76 has the opposite ends thereof rotatably journalled in bearings 77 and 78 carried by the side plates 67 and 68, respectively. The shaft 76 is driven from the stub shaft 73 by means of a drive chain 80. The drive chain 80 is entrained over a drive sprocket 81 carried by the stub shaft 73 and a driven sprocket 82 carried by the shaft 76.

The side plates 67 and 68 are connected together at their upper left-hand corners by means of a transverse rod 83. The rod 83 supports a bracket 84 which is positioned centrally of the frame 66, as is generally shown in FIG. 3. The bracket 84, in turn, supports a vertical guide 85 for can bodies which are horizontally disposed. The vertical guide 85 is aligned with the lower end of a chute 86 through which can bodies are delivered to the guide 85. A spiral feed screw 87 is positioned adjacent the guide 85 for effecting the movement of the can bodies through the guide 85 in a predetermined spaced relation. The feed screw 87 is carried by a shaft 88 which has its upper end suitably journalled in a bearing carried by a plate 89 and its lower end suitably journalled in a bearing carried by a plate 90. The plates 89 and 90 are carried by the bracket 84.

The bracket 84 supports a horizontal shaft 91 which is provided with a bevel gear 92 on one end thereof. The bevel gear 92, in turn, engages a bevel gear 93 secured to the lower end of the shaft 88 for effecting the rotation of the shaft 88. The opposite end of the shaft 91 is provided with a sprocket 94 which is aligned with a sprocket 95 carried by the shaft 76. A drive chain 96 is entrained over the sprockets 94 and 95 and drivingly connects the two together so that the shaft 76 is utilized in the driving of the shaft 88. If desired, an idler sprocket 97 may be provided for the purpose of adjusting the tension of the chain 96, the idler sprocket 97 being shown in FIG. 3.

The shaft 76 carries a turret which is generally referred to by the numeral 98. The turret 98 is formed of a pair of spaced plates 100 which are mounted on the shaft 76 for rotation therewith. The plates 100 have seats 101 formed therein for the reception of the can bodies from the lower end of the guide 85. Inasmuch as the plates 100 are rotated in timed relation to the movement of the can bodies along the guide 85 by the feed screw 87, it will be seen that each can body has available a seat 101 therefor when it reaches the lower end of the guide 85.

The frame 66 also includes a transverse rod 102 which extends between the side plates 67 and 68 and ties together the same. There is mounted on the central portion of the rod 102 a suitable bracket structure 103 which, in turn, supports a suitable guide 104. The guide 104 is of a suitable construction for retaining the can bodies within the turret 98 as they pass about the lower portion of the travel of the turret 98.

The shaft 69 carries a turret which is generally referred to by the numeral 105. The turret 105 includes a large center hub member 106 which is polygonal in outline and which carries a plurality of can body support shoes 107 disposed in circumferentially spaced relation. It is to be noted that the support shoes 107 are spaced both circumferentially and radially in accordance with the path of movement of mandrels 51 about the axis of the shaft 69. It is also to be noted that the spacing of the supporting shoes 107 corresponds to the spacing of the pockets 101 in the turret 98. Furthermore, it is to be noted that the timing of the rotation of the turrets 105 and 98 is such that the pockets 101 are aligned with the support shoes 107 at the point of transfer between the two turrets whereby a can body may be readily transferred from the turret 98 to the turret 105.

It is to be understood that when a can body is transferred to the turret 105 from the turret 98, the can body is loosely seated in a support shoe 107 thereof. In order to prevent the accidental displacement of a can body radially outwardly of its associated support shoe 107, there is carried by the bracket 103 a further guide structure, which is referred to by the numeral 108. The guide structure 108 is suitably constructed to retain the can bodies in the support shoes 107 as they move upwardly and about the top of the turret 105, as viewed in FIG. 4.

As is clearly shown in FIG. 3, the shaft 69 also carries for rotation therewith a pusher unit, which is generally referred to by the numeral 110. The pusher unit 110, as is best shown in FIGS. 3 and 5, includes a hub 111 which is keyed onto the shaft 69. The hub 111 carries a pair of support wheels 112 which are spaced axially of the shaft 69. The support wheels 112, in turn, support sleeves 113 which extend parallel to the shaft 69 and which are aligned with the support shoes 107 of the turret 105. The sleeves 113 have positioned therein shafts 114 which are mounted for reciprocatory movement parallel to the shaft 69. The shafts 114 are keyed by means of keys 115 to their respective sleeves 113 so as to fix the shafts 114 against rotation.

The pusher unit 110 also includes a cam track 116 which is fixedly mounted on the side frame plate 68. The cam 116 is cylindrical in outline and is concentric about the axis of the shaft 69. The stroke of the cam 116 is longitudinally of the shaft 69.

It is to be noted that each of the shafts 114 is provided at the end thereof remote from the turret 105 with a cam follower 117. Each cam follower 117 has a mounting fastener 118 which extends generally normal to the axis of its associated shaft 114. The cam follower of each shaft 114 rides in the cam 116 and effects the reciprocation of the respective shaft 114 in timed relation to the rotation of the pusher unit 110.

Referring now to FIG. 6 in particular, it will be seen that each of the shafts 114 is provided at the end thereof remote from the cam follower 117 thereof with a reduced end portion 119. The reduced end portion 119 has suitably secured thereon, such as by means of a threaded connection 120, a head 121. The head 121 may be locked in place by means of a set screw 122. The head 121 has a resilient cushion 123 suitably secured on the free end thereof with the cushion 123 being particularly shaped for engaging an end of a can body and exerting an axial force thereon in a manner so as to not damage the can body in any manner whatsoever.

It will be apparent from FIG. 3 that as a can body moves about the axis of the shaft 69 in supporting relation by means of the turret 105, it is aligned with both a mandrel 51 and one of the shafts 114. This relationship is maintained through at least 360° of the rotation of a can body about the shaft 69. As the can body rotates about shaft 69, the shaft 114 associated therewith is advanced towards the aligned mandrel 51 and first comes into engagement with the adjacent end of a can body. After the head 121 of the particular shaft 114 engages the associated end of the can body, it begins to move the can body axially cut of its associated support shoe 107. The movement of the can body axially of the shaft 69 results in the can body open end freely passing over the mandrel 51 in the manner generally shown schematically in FIG. 3 and specifically in FIG. 3. The stroke of the cam 116 is such so as to effect the full seating of a can body on an associated mandrel 51. As is clearly shown in FIGS. 2 diagrammatically, the shape of the cam 116 is such to provide for the automatic projection and retraction of the shafts 114 sufficient to effect the necessary transfer of can bodies from the turret 105 to the mandrels 51 in timed relation to the rotation of the shaft 69. The frame 66 also includes a side plate 68' which, in conjunction with the side plate 67, supports the printing apparatus 32 and the varnishing apparatus 33.

Although only a preferred embodiment of the invention has been specifically illustrated and described herein, it is to be understood that minor variations may be made therein within the spirit and scope of the invention, as defined by the appended claims.

I claim:

1. An apparatus for placing can bodies on mandrels carried by a moving endless chain, said apparatus comprising a turret having pockets for receiving and supporting can bodies, said pockets moving in alignment with said mandrels for a portion of the mandrel travel, and pushers for pushing can bodies from said turret pockets onto said mandrels.

2. The apparatus of claim 1 together with an upright feed screw disposed adjacent to and at one side of said turret for positioning can bodies in vertically spaced relation for reception in said turret, and drive means for driving said feed screw and said turret in timed relation.

3. A transfer apparatus for can bodies comprising a transfer turret having generally horizontal extending and radially opening pockets for can bodies, a sprocket having an endless chain entrained thereon, mandrels carried by said endless chain at a spacing corresponding to the spacing of said endless chain at a spacing corresponding to the spacing of said turret pockets, means mounting said sprocket and said transfer turret for rotation in unison about a generally horizontal axis with said mandrels being in axial alignment with said turret pockets, and pusher means for pushing can bodies from said turret pockets onto said mandrels.

4. The transfer apparatus of claim 3 wherein said pusher means includes a pusher turret mounted for rotation about said axis in unison with said transfer turret and said mandrels, and a plurality of pusher members carried by said pusher turret in axial alignment with said turret pockets and said mandrels.

5. The transfer apparatus of claim 3 wherein said pusher means includes a pusher turret mounted for rotation about said axis in unison with said transfer turret and said mandrels, and a plurality of pusher members carried by said pusher turret in axial alignment with said turret pockets and said mandrels, and fixed cam means cooperable with said pusher members for cooperation therewith during the rotation thereof with said pusher turret to axially reciprocate said pusher 6. The apparatus of claim 3 together with an upright feed screw disposed adjacent to and at one side of said transfer turret for vertically spacing can bodies in accordance with the spacing of said turret pockets for transfer to said transfer turret, and drive means for driving said feed screw and said transfer turret in timed relation.

7. The apparatus of claim 6 together with a feed turret positioned between said feed screw and said transfer turret for feeding can bodies from said feed screw to said transfer turret, and means for driving said feed turret in timed relation to the driving of said feed screw and said transfer turret.

8. The apparatus of claim 3 together with an upright feed screw for vertically spacing can bodies in accordance with the spacing of said turret pockets for transfer to said transfer turret, a feed turret positioned between said feed screw and said transfer turret for feeding can bodies from said feed screw to said transfer turret, and drive means for driving said feed screw, said feed turret, said transfer turret, said sprocket and said pusher turret in unison, said drive means including said endless chain.

\* \* \* \* \*